(12) United States Patent
Meyer (10) Patent No.: US 8,228,036 B2
(45) Date of Patent: Jul. 24, 2012

(54) METHOD AND SYSTEM FOR DETERMINING BATTERY CELL VOLTAGE

(75) Inventor: Gary D. Meyer, Waukesha, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 653 days.

(21) Appl. No.: 12/367,992

(22) Filed: Feb. 9, 2009

(65) Prior Publication Data

US 2009/0160452 A1 Jun. 25, 2009

Related U.S. Application Data (60) Continuation-in-part of application No. 11/617,365, filed on Dec. 28, 2006, now Pat. No. 7,504,804, which is a continuation of application No. 11/322,862, filed on Dec. 30, 2005, now Pat. No. 7,164,257, which is a division of application No. 10/720,027, filed on Nov. 20, 2003, now Pat. No. 7,157,882.

(60) Provisional application No. 60/428,356, filed on Nov. 22, 2002, provisional application No. 60/428,358, filed on Nov. 22, 2002, provisional application No. 60/428,450, filed on Nov. 22, 2002, provisional application No. 60/428,452, filed on Nov. 22, 2002, provisional application No. 60/440,692, filed on Jan. 17, 2003, provisional application No. 60/440,693, filed on Jan. 17, 2003, provisional application No. 60/523,712, filed on Nov. 19, 2003, provisional application No. 60/523,716, filed on Nov. 19, 2003, provisional application No. 61/026,873, filed on Feb. 7, 2008.

(51) Int. Cl.
*H02J 7/00* (2006.01)

(52) U.S. Cl. ...................................... 320/134

(58) Field of Classification Search .......... 320/116–123, 320/134, 136; 324/434; 340/636; 702/63
See application file for complete search history.

(56) References Cited

U.S. PATENT DOCUMENTS

| | | | |
|---|---|---|---|
| 6,020,743 A | 2/2000 | Reeves et al. | |
| 6,191,554 B1 * | 2/2001 | Nakane et al. | 320/114 |
| 6,268,710 B1 | 7/2001 | Koga | |
| 6,332,113 B1 * | 12/2001 | Bertness | 702/63 |
| 6,532,425 B1 * | 3/2003 | Boost et al. | 702/63 |

FOREIGN PATENT DOCUMENTS

WO 01/39351 5/2001

OTHER PUBLICATIONS

Craig et al., IBM Technical Disclosure Bulletin—Failed Cell Detector for Series Batteries, TDB 10-81, pp. 2248-2249, Oct. 1981.*

* cited by examiner

*Primary Examiner* — Melissa J. Koval
*Assistant Examiner* — Daniel Miller
(74) *Attorney, Agent, or Firm* — Michael Best & Friedrich LLP (57) ABSTRACT

Embodiments of the invention relate to a method and system of determining over-voltage and under-voltage conditions for cells in a battery pack. The method includes combining the cells in a battery pack into groups, detecting each cell group's voltage, and calculating ratios of cell group voltages to determine over-voltage and under-voltage conditions.

14 Claims, 7 Drawing Sheets

METHOD AND SYSTEM FOR DETERMINING BATTERY CELL VOLTAGE

RELATED APPLICATIONS

This application is a continuation-in-part of prior filed co-pending U.S. patent application Ser. No. 11/617,365, filed Dec. 28, 2006, which is a continuation of U.S. patent application Ser. No. 11/322,862, filed on Dec. 30, 2005, now U.S. Pat. No. 7,164,257, which is a divisional of U.S. patent application Ser. No. 10/720,027, filed on Nov. 20, 2003, now U.S. Pat. No. 7,157,882, which claims the benefit of U.S. provisional patent application Ser. No. 60/428,356, filed on Nov. 22, 2002; Ser. No. 60/428,358, filed on Nov. 22, 2002; Ser. No. 60/428,450, filed on Nov. 22, 2002; Ser. No. 60/428,452, filed on Nov. 22, 2002; Ser. No. 60/440,692, filed Jan. 17, 2003; Ser. No. 60/440,693, filed on Jan. 17, 2003; Ser. No. 60/523,712, filed on Nov. 19, 2003; and Ser. No. 60/523,716, filed on Nov. 19, 2003. The entire contents of all of the above-listed applications are hereby incorporated by reference.

The present application also claims the benefit of prior filed U.S. provisional patent application Ser. No. 61/026,873, filed on Feb. 7, 2008, the entire contents of which are hereby incorporated by reference.

FIELD OF THE INVENTION

The invention relates to measuring cell voltages in battery packs.

BACKGROUND OF THE INVENTION

Existing methods of determining cell voltages in a battery pack generally include measuring each cell's voltage and monitoring individual cells for over-voltage or under-voltage conditions. As the number of cells increases in higher voltage battery packs, the number of required voltage readings also increases. The number of connections required to measure every cell's voltage is equal to the number of cells plus one. The more battery cells and more connections a battery pack requires, the greater the physical and computational costs.

SUMMARY OF THE INVENTION

Embodiments of the invention relate to a method of determining over-voltage and under-voltage conditions for cells in a battery pack. The method includes combining the cells in a battery pack into groups, detecting each cell group's voltage, and calculating ratios of cell group voltages to determine over-voltage and under-voltage conditions. Other embodiments relate to additional methods of determining cell over-voltage and under-voltage conditions, as well as systems for implementing the methods.

In one embodiment, the invention provides a battery pack that includes a housing, a first group of cells, a second group of cells, at least two tap connections, and a detection circuit. The first group of cells is positioned within the housing and includes at least one cell. The second group of cells is also positioned within the housing and includes at least one cell. The at least two tap connections are positioned with respect to the first and second groups of cells to provide a plurality of voltages related to the first and second groups of cells. The at least two tap connections are connected to the detection circuit, and the detection circuit is operable to calculate at least one voltage ratio between the first group of cells and the second group of cells.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
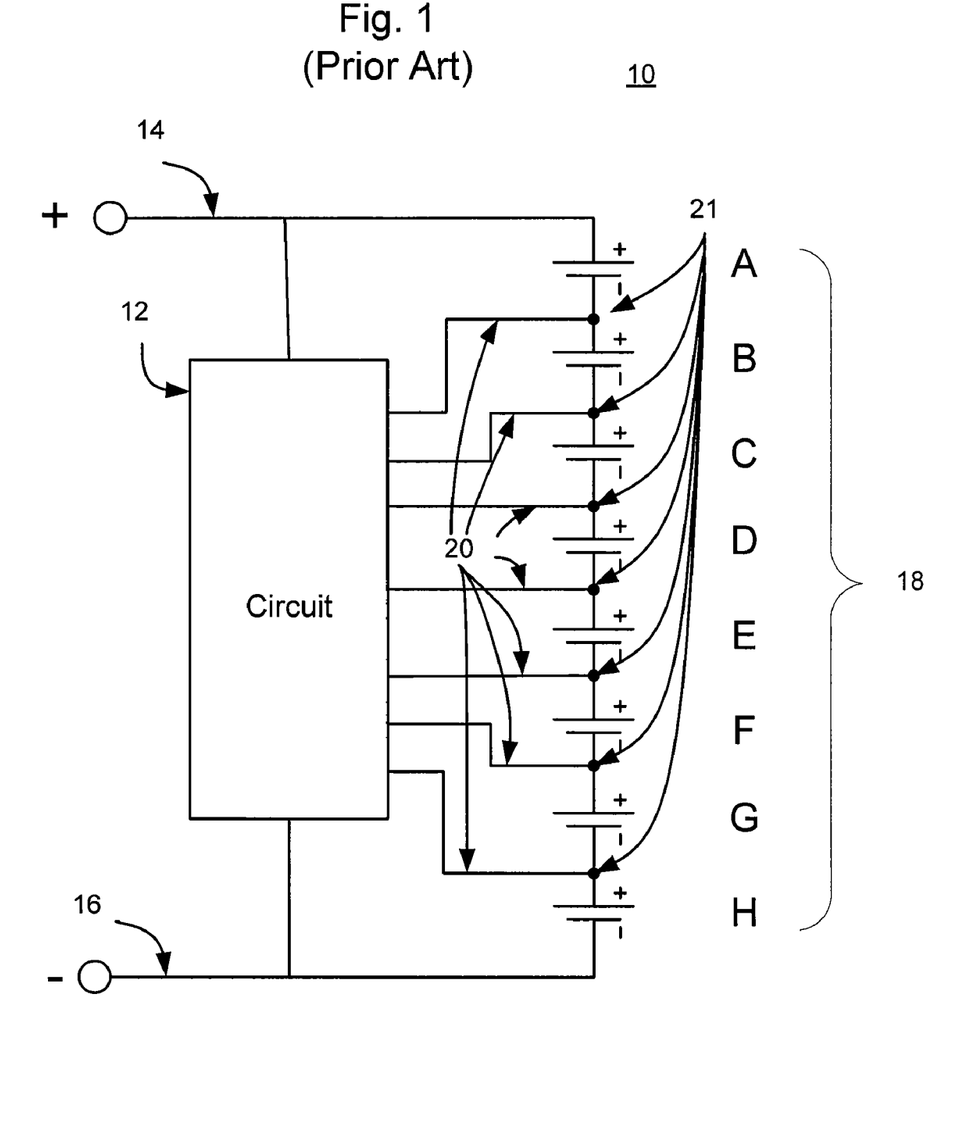
FIG. 1 illustrates a system for measuring individual cell voltages in a battery pack.

FIG. 1 illustrates a system 10 for determining cell over-voltage and cell under-voltage. The system 10 includes a detection circuit 12, a first tap connection 14, a second tap connection 16, a plurality of battery cells (A-H) 18, a plurality of intermediate tap connections 21, and a plurality of signal lines 20. The first tap connection 14 and the second tap connection 16 are connected to the detection circuit 12. The first tap connection 14 and the second tap connection 16 are tap connections that are located at the distal ends (e.g., the highest and lowest respective battery pack voltages) of the plurality of battery cells 18. For descriptive purposes only, the first and second tap connections 14 and 16 are referred to herein as a positive voltage terminal and a negative voltage terminal, respectively. The positive and negative voltage terminals provide reference voltages to various detection circuits described herein. The remaining tap connections (i.e., the intermediate tap connections 21 described with respect to FIG. 1) are referred to as the tap connections.

In the system 10, the detection circuit 12 detects the voltage of each cell in a battery pack. Each of the plurality of tap connections 21 is connected to one of the plurality of signal lines 20. Each signal line is then an input to the detection circuit 12. Using the positive voltage terminal 14 and the negative voltage terminal 16 as reference voltages, the voltage of each of the plurality of battery cells 18 is calculated. As a result, the detection circuit 12 determines which, if any, of the plurality of battery cells 18 is in an over-voltage condition or an under-voltage condition. As the number of battery cells in the battery pack increases, the number of tap connections and signal lines also increases. The number of tap connections and signal lines necessary to determine the voltage of each cell in the battery pack is equal to (N−1), where N is the number of cells in the battery pack. For descriptive purposes only, and as described above, the positive voltage terminal 14 and the negative voltage terminal 16 are not referred to herein as tap connections.

Figure 2:
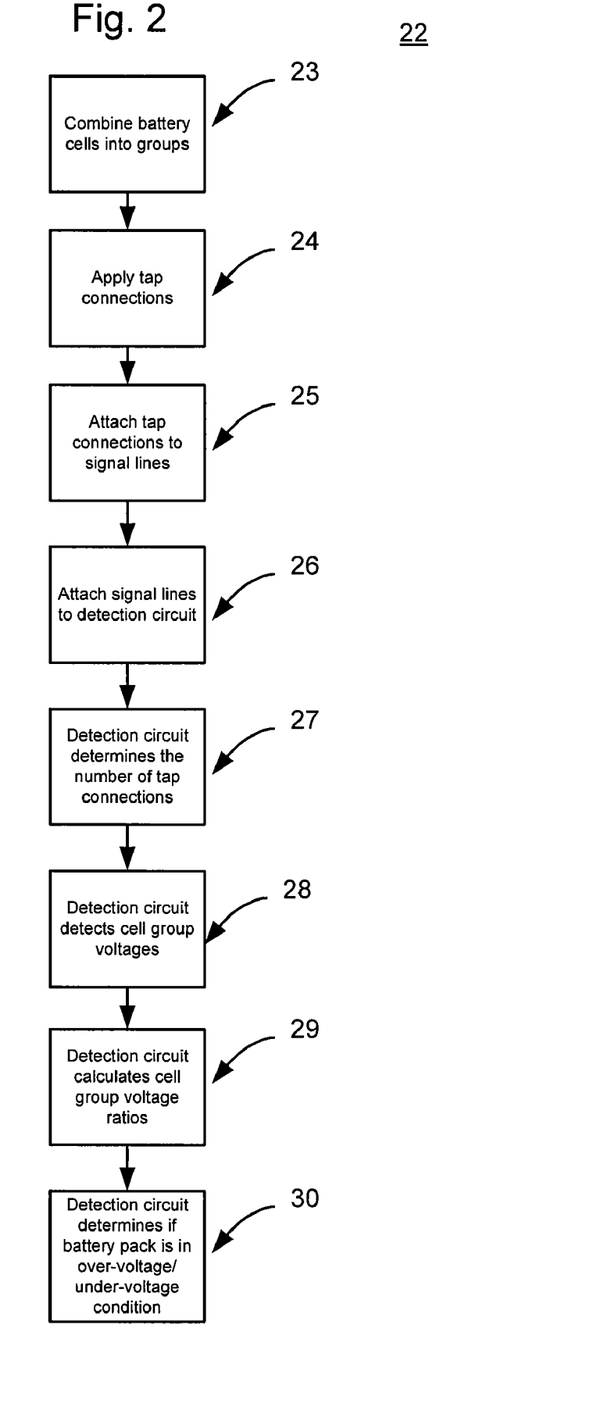
FIG. 2 illustrates a process for determining cell over-voltage and under-voltage according to an embodiment of the invention.

An embodiment of a process 22 for determining cell over-voltage and under-voltage in a battery pack is illustrated in FIG. 2. The battery pack can have any of a plurality of different voltage ratings, sizes, and chemistries (e.g., lead-acid, Ni-MH, NiCd, Li-Ion, etc.). The battery pack can be attachable to and detachable from a plurality of electrical devices such as power tools, battery chargers, test and measurement equipment, vacuum cleaners, outdoor power equipment, and vehicles. Power tools can include drills, circular saws, jig saws, band saws, reciprocating saws, screw drivers, angle grinders, straight grinders, hammers, impact wrenches, angle drills, inspection cameras, and the like. Battery chargers can include wall chargers, multi-port chargers, travel chargers, and the like. Test and measurement equipment can include digital multimeters, clamp meters, fork meters, wall scanners, IR temperature guns, laser distance meters, laser levels, and the like. Vacuum cleaners can include stick vacuums, hand vacuums, upright vacuums, carpet cleaners, hard surface cleaners, canister vacuums, broom vacuums, and the like. Outdoor power equipment can include blowers, chain saws, edgers, hedge trimmers, lawn mowers, trimmers, and the like. The battery pack can also be attachable to and detachable from devices such as electronic key boxes, calculators, head phones, and multi-purpose cutters.

A plurality of cells is combined into a cell group (step 23). The positive and negative terminal connections are made at distal ends of the battery pack. Tap connections are then made such that there is either a terminal or a tap connection on each side of each cell group (step 24). The total number of tap connections required is equal to (N−1), where N is the number of cell groups. The tap connections are connected to a plurality of signal lines such that the number of signal lines equals the number of tap connections (step 25). The signal lines are then connected to the detection circuit (step 26). When the necessary connections are made, the detection circuit determines the number of tap connections (step 27). Following step 27, the detection circuit detects each cell group voltage (step 28). The detection circuit then calculates a cell group voltage ratio for each possible combination of group voltages (step 29). The circuit then determines if the battery pack is in an over-voltage or under-voltage condition (step 30).

Figure 3:
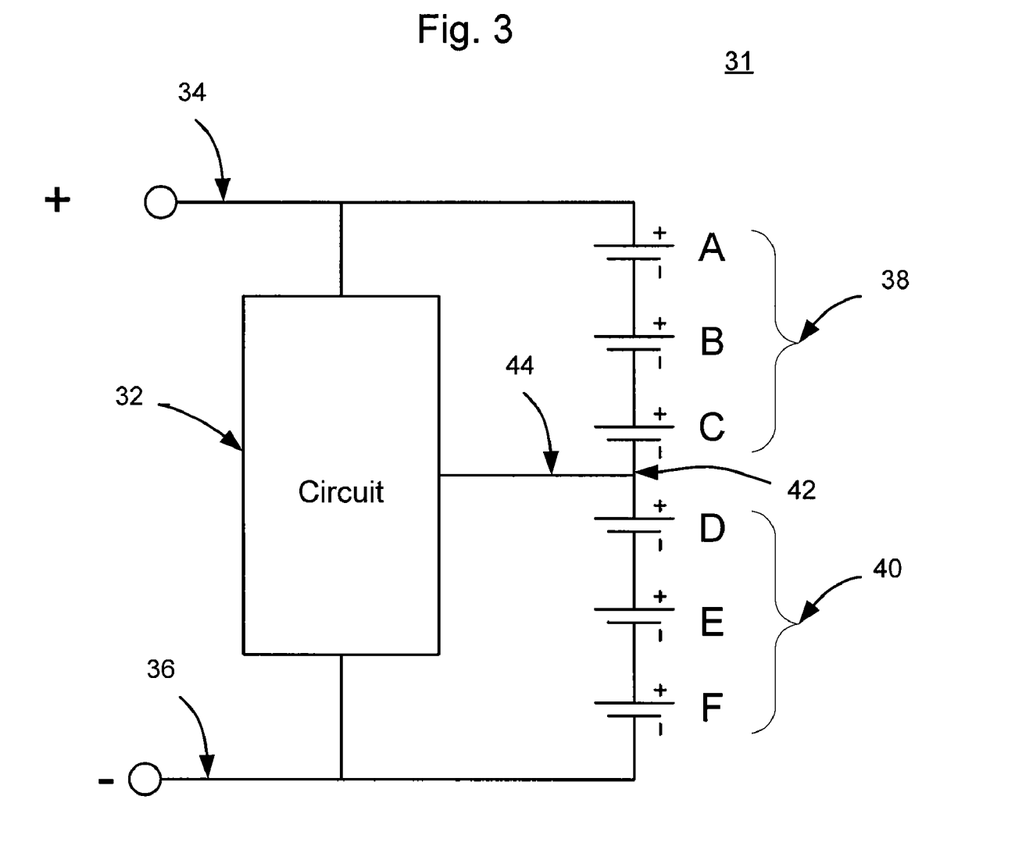
FIG. 3 illustrates a system for measuring cell group voltages for a six-cell battery pack according to an embodiment of the invention.

FIG. 3 illustrates an embodiment of a system 31 within a housing or outer casing of a battery pack for implementing process 22 from FIG. 2. The system 31 includes a detection circuit 32, a positive voltage terminal 34, a negative voltage terminal 36, a first group of cells 38, a second group of cells 40, a tap connection 42, a signal line 44, and a plurality of battery pack cells A-F.

In the system 31, the positive voltage terminal 34 and the negative voltage terminal 36 are electrically connected to the detection circuit 32. Battery pack cells A-F are divided into the first group of cells (A-C) 38, and the second group of cells (D-F) 40. The tap connection 42 is positioned between the first group of cells 38 and the second group of cells 40. The signal line 44 is electrically connected to the tap connection 42 and the detection circuit 32. The detection circuit 32 uses the positive voltage terminal 34 and the negative voltage terminal 36 as reference voltages. The input voltage to the detection circuit 32 from the signal line 44 allows the detection circuit 32 to compare the voltage of the first group of cells 38 to the voltage of the second group of cells 40.

As the number of cells increase, the number of cells in each cell group increases. As the number of cells in each cell group increases, the accuracy of detecting when an individual cell is either in an over-voltage or under-voltage condition decreases as a reciprocal of the number of cells in each cell group. In the system 31, the first group of cells 38 and the second group of cells 40 each have three battery cells, A-C and D-F, respectively. Cell over-voltages and cell under-voltages are determined by taking the ratio of the voltages of the groups of cells. For example, the ratio is taken of the first group of cells 38 and the second group of cells 40. If there is a considerable disparity between the group voltages, at least one battery cell in one of the groups is in an over-voltage condition or an under-voltage condition. For example, if any of the voltages of cells A, B, or C match the voltages of cells D, E, or F, the ratio of the voltage groups will remain unchanged. However, if any of the voltages of cells A, B, or C or the voltages of cells D, E, or F are in an over-voltage or under-voltage condition and not matched by a cell in the other group, the ratio of voltages will be less than one or greater than one or a different predetermined ratio, and the disparity is detected.

Figure 4:
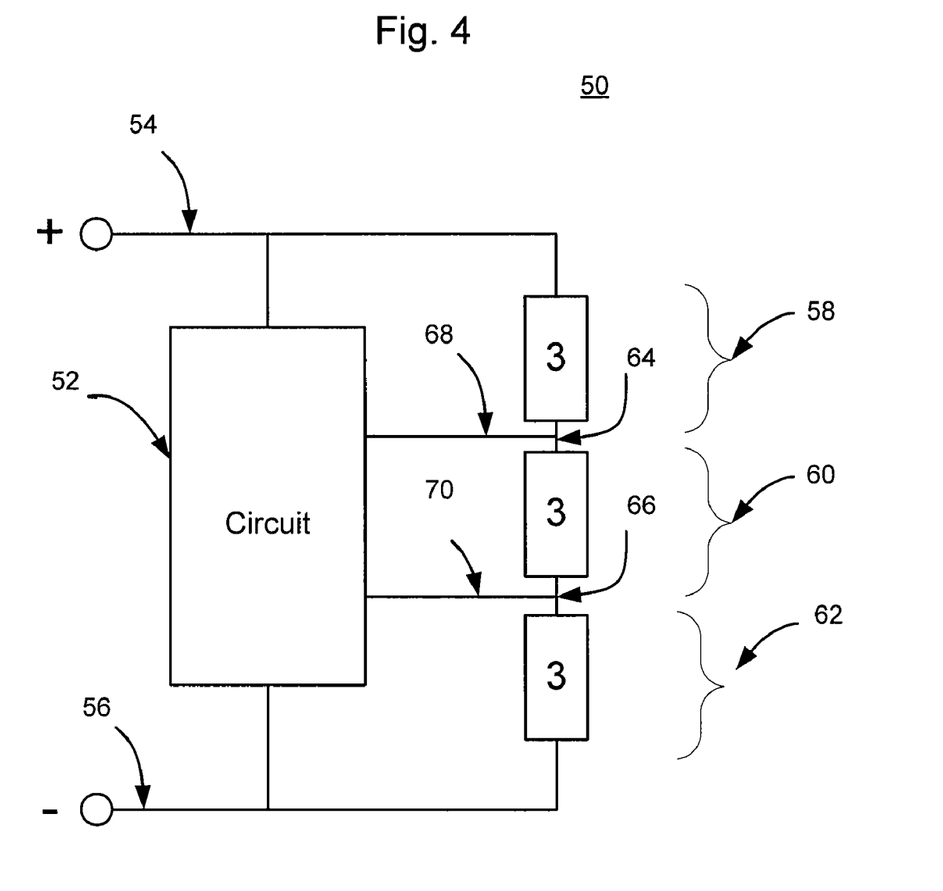
FIG. 4 illustrates a system for measuring cell group voltages for a nine-cell battery pack according to an embodiment of the invention.

Another embodiment of a system for determining cell over-voltage and cell under-voltage is illustrated in FIG. 4. A system 50 for determining cell over-voltage and under-voltage includes a detection circuit 52, a positive voltage terminal 54, a negative voltage terminal 56, a first group of cells 58, a second group of cells 60, a third group of cells 62, a first tap connection 64, a second tap connection 66, a signal line 68, and a signal line 70. Each of the first, second, and third groups of cells include, in this embodiment, three cells. The positive voltage terminal 54 and the negative voltage terminal 56 are electrically connected to the detection circuit 52. The input voltages from the signal line 68 and the signal line 70 allow the detection circuit 52 to compare the voltages of the first group of cells 58, the second group of cells 60, and the third group of cells 62.

As described above with respect to FIG. 3, cell over-voltages and cell under-voltages are determined by taking the ratio of the voltages of the groups of cells. Unlike the system 31 of FIG. 3, the system 50 includes three groups of cells. In order to make the necessary over-voltage or under-voltage determination, ratios of all three groups of cells are taken. Similar techniques may be applied to battery packs that include more than three groups of cells. Each possible combination of cell group ratios is made by the detection circuit before cell over-voltage or under-voltage is determined. For example, in the system 50, the detection circuit 12 takes a ratio of the first group of cells 58 and the second group of cells 60. The detection circuit then takes the ratio of the second group of cells 60 to the third group of cells 62. Finally, the detection circuit 52 takes the ratio of the third group of cells 62 to the first group of cells 58. If any of the three ratios of cell groups is outside of a defined range, a detection of an over-voltage or an under-voltage condition is made. In further embodiments, battery packs with higher numbers of cell groups are used.

Figure 5:
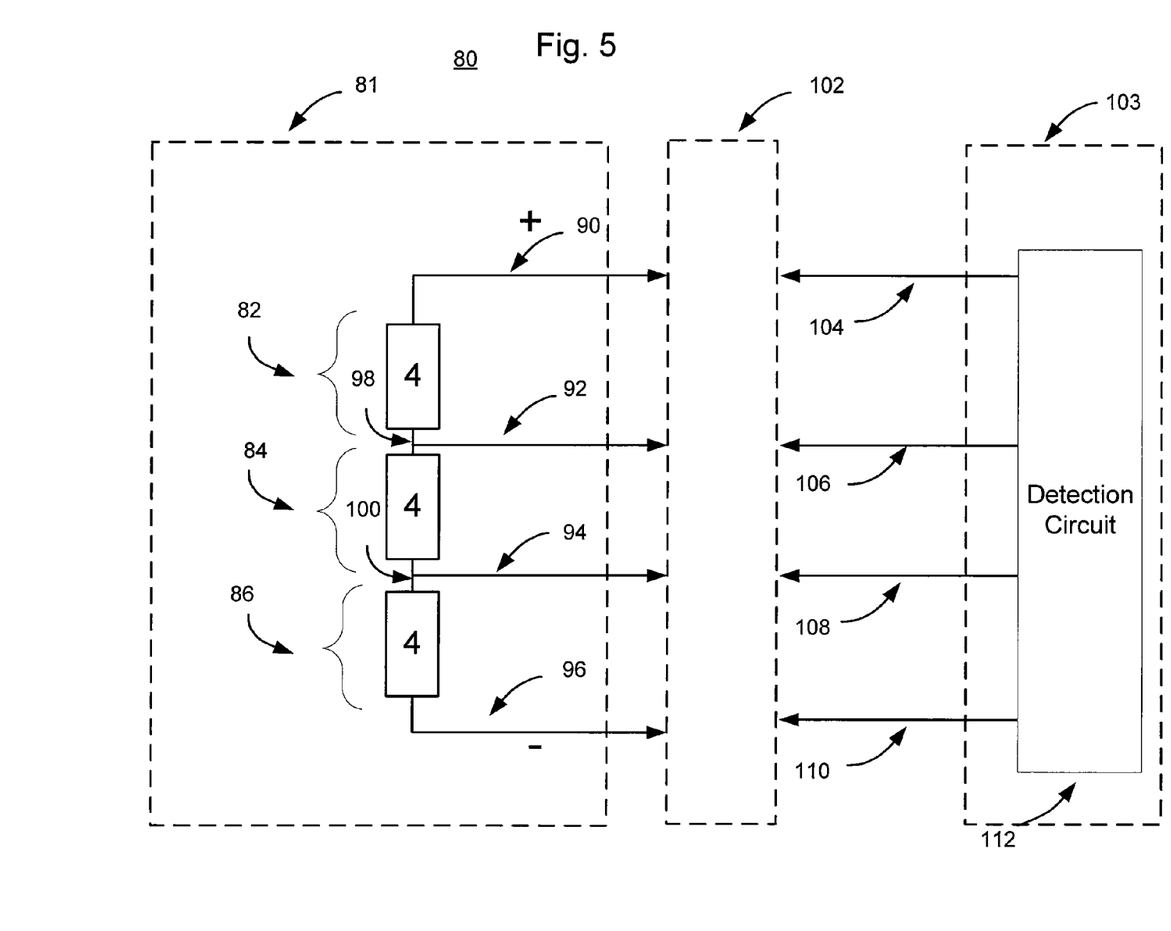
FIG. 5 illustrates the interaction between a twelve-cell battery pack and an external device according to an embodiment of the invention.

FIG. 5 shows a system 80 for determining a cell over-voltage and cell under-voltage condition according to another embodiment of the invention. The system 80 includes a battery pack 81, a connection interface 102, and an external device 103. The battery pack 81 includes a first group of cells 82, a second group of cells 84, a third group of cells 86, a positive voltage terminal 90, a first signal line 92, a second signal line 94, a negative voltage terminal 96, a first tap connection 98, and a second tap connection 100. The external device 103 includes a positive terminal connector 104, a first signal connector 106, a second signal connector 108, a negative terminal connector 110, and a detection circuit 112.

The connection interface 102 allows the positive voltage terminal 90 to connect to the positive terminal connector 104, the negative voltage terminal 96 to connect to the negative terminal connector 110, the first signal line 92 to connect to the first signal connector 106, and the second signal line 94 to connect to the second signal connector 108. In other embodiments, additional connections between the battery pack and the external device are made.

Unlike previous embodiments, this embodiment does not include detection circuitry in the battery pack 81. Instead, a connection interface 102 is provided to bridge connections from the battery pack 81 to the external device 103. The external device 103 includes the detection circuit 112 for determining cell over-voltage and under-voltage conditions. The detection circuit 112 functions generally in the same or a similar manner as the detection circuit 52 from FIG. 4. However, the detection circuit 112 takes ratios of cell groups that each include four cells. As a result, the detection accuracy of the detection circuit 112 is diminished relative to that of the detection circuit 52 in FIG. 4. The external device 103 may be an electric power tool, a battery charger, a portable electronic device, or the like.

Figure 6:
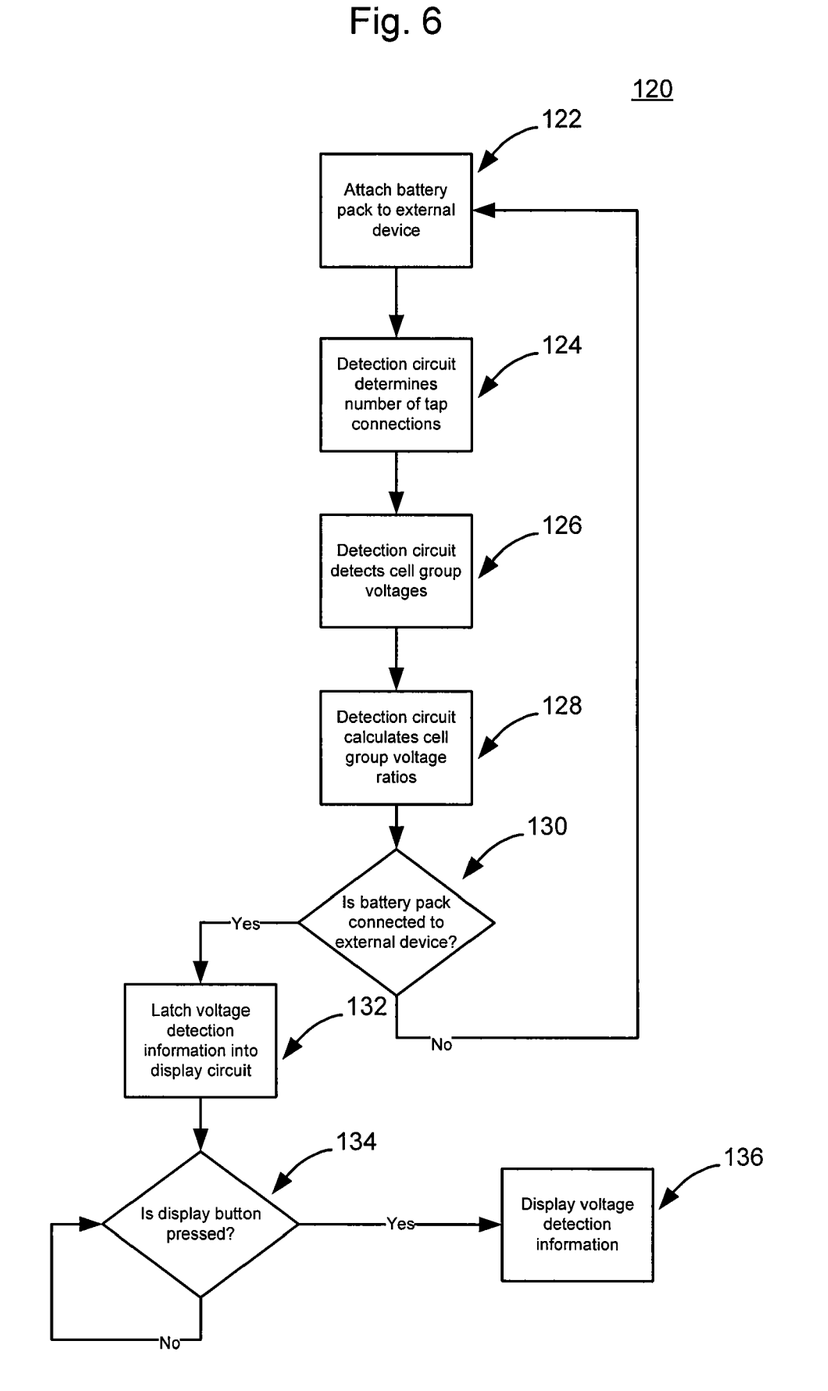
FIG. 6 illustrates a process for determining cell over-voltage and under-voltage and displaying a result according to an embodiment of the invention.

FIG. 6 illustrates an exemplary embodiment of a process 120 for determining cell over-voltage and cell under-voltage. A battery pack is attached to an external device (step 122). A detection circuit within the external device determines the number of tap connections from the battery pack (step 124). The detection circuit then detects the cell group voltages (step 126). After step 126, the detection circuit calculates a cell group voltage ratio for each possible combination of cell groups (step 128). If the battery pack is no longer connected to the external device, the external device waits for another battery pack to be inserted (step 130). If the battery pack is still connected to the external device, the voltage detection information from the detection circuit is latched into a display circuit in the battery pack (step 132). The display circuit does not display the results of the voltage detection until a display button is pressed (step 134). When the display circuit recognizes that the display button was pressed, the voltage detection information is displayed (step 136).

Figure 7:
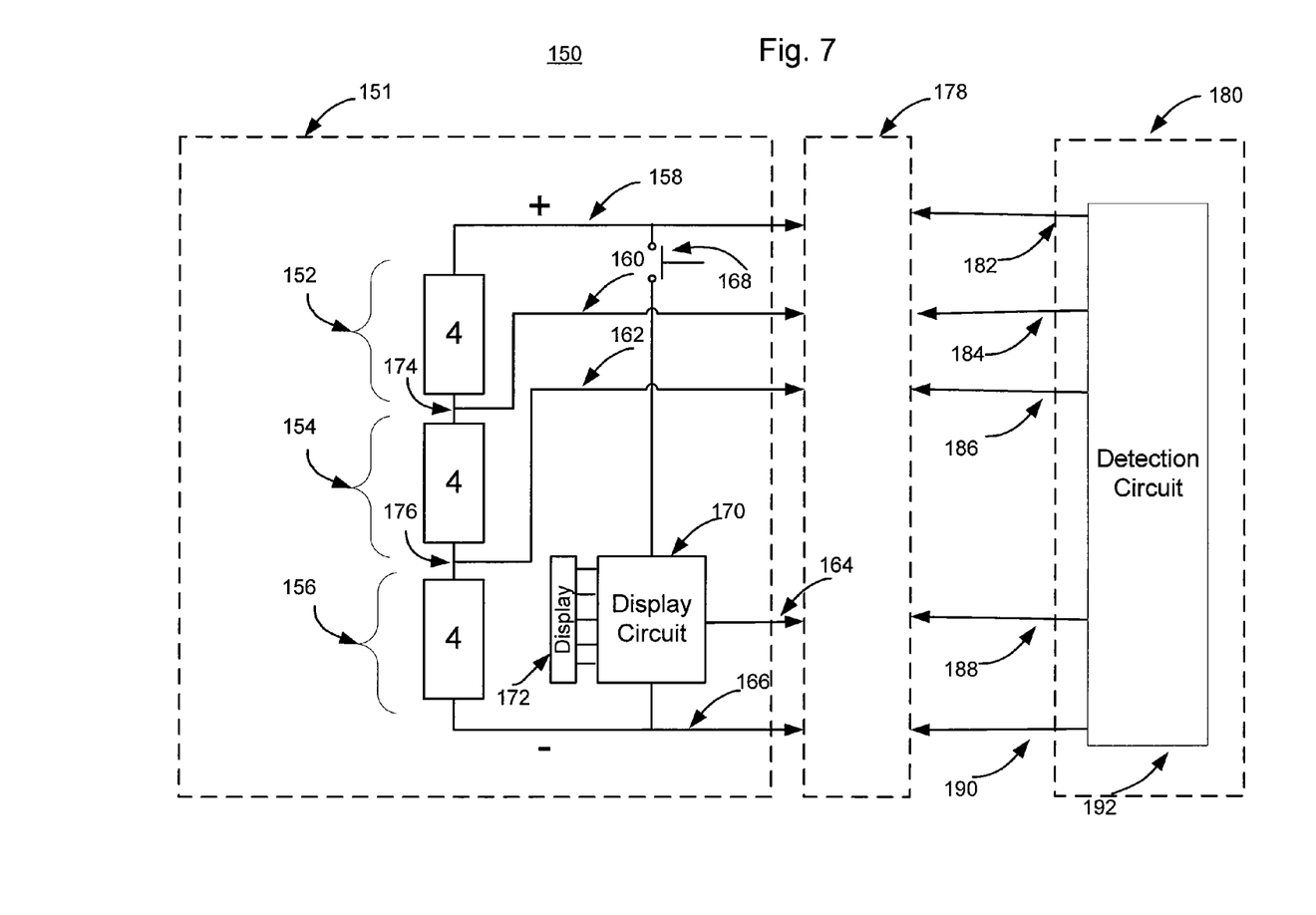
FIG. 7 illustrates the interaction between a twelve-cell battery pack with voltage-level display circuitry and an external device according to an embodiment of the invention.

An exemplary embodiment of a system 150 for implementing the process 120 from FIG. 6 is shown in FIG. 7. The system 150 includes a battery pack 151, a connection interface 178, and an external device 180. The battery pack 151 includes a first group of cells 152, a second group of cells 154, a third group of cells 156, a positive voltage terminal 158, a first signal line 160, a second signal line 162, a communications line 164, a negative voltage terminal 166, a display button 168, a display circuit 170, a display 172, a first tap connection 174, and a second tap connection 176. The external device 180 includes a positive terminal connector 182, a first signal connector 184, a second signal connector 186, a communications connector 188, a negative terminal connector 190, and a detection circuit 192.

The connection interface 178 allows the positive voltage terminal 158 to connect to the positive terminal connector 182, the negative voltage terminal 166 to connect to the negative terminal connector 190, the first signal line 160 to connect to the first signal connector 184, the second signal line 162 to connect to the second signal connector 186, and the communications line 164 to connect to the communications connector 188.

The system 150 is similar to the system 80 from FIG. 5 in that detection circuitry is located in an external device 180. Voltage ratios for the first group of cells 152, the second group of cells 154, and the third group of cells 156 are made in the same or a similar manner as described with respect to FIG. 4. However, additional features and circuitry are provided in the battery pack 151 that indicate voltage levels detected by the detection circuit. The battery pack 151 includes the display button 168 that is connected to the display circuit 170. The display circuit 170 drives a display 172 that gives an indication to the user of the voltage level of the battery pack 151. The display 172 may include light emitting diodes (LED's), an alphanumeric display, a liquid crystal display, an analog level indicator, or the like.

When the display button 168 is pressed, the display circuit 170 outputs data to the display 172 indicating the most recently detected voltage levels. The display button 168 may include a mechanical switch, a mechanical button, a touch screen display, a capacitive sensor, and the like. Information related to the most recently detected voltage levels is delivered to the display circuit 170 via the communications line 164 and the communications connector 188. When the battery pack 151 is connected to the external device 180 and voltage is detected, the detection information is latched into the display circuit 170 in the battery pack 151 via the communications line 164 and the communications connector 188. In some embodiments, the battery pack 151 is designed such that when the display button 168 is not pressed, no power is supplied to the display circuit 170. When the display button 168 is pressed, power is supplied to the display circuit 170, and the display 172 indicates the last voltage detection information received by the display circuit 170.

Although the invention has been described in detail with reference to certain embodiments, variations and modifications exist within the scope and spirit of one or more aspects of the invention as described.

Thus, the invention provides, among other things, systems and methods for determining over-voltage and under-voltage conditions of cells in a battery pack by combining the cells of a battery pack into groups, detecting each cell group's voltage, and calculating ratios of cell group voltages. Various features and advantages of the invention are set forth in the following claims.

What is claimed is:

1. A battery pack comprising:
a housing;
a first group of cells positioned within the housing, wherein the first group of cells includes at least two series-connected cells;
a second group of cells positioned within the housing, wherein the second group of cells includes at least two series-connected cells;
a third group of cells positioned within the housing, wherein the third group of cells includes at least two series-connected cells,
wherein the first group of cells, the second group of cells, and the third group of cells are connected in series; and
two tap connections to connect the first group of cells, the second group of cells, and the third group of cells to a detection circuit to provide respective voltages across the first, second, and third groups of cells to the detection circuit, the detection circuit including a microprocessor programmed to calculate at least one voltage ratio between the first group of cells and the second group of cells, at least one voltage ratio between the second group of cells and the third group of cells, and at least one voltage ratio between the third group of cells and the first group of cells, wherein the microprocessor is programmed to compare the at least one voltage ratio between the first group of cells and the second group of cells to a predetermined voltage ratio, compare the at least one voltage ratio between the second group of cells and the third group of cells to the predetermined voltage ratio, and compare the at least one voltage ratio between the third group of cells and the first group of cells to the predetermined voltage ratio, and wherein the microprocessor is programmed to determine at least one of an over-voltage condition and an under-voltage condition of a cell in the first, second or third group of cells based on the comparisons.

2. The battery pack of claim 1, further comprising an interface for connecting the two tap connections to the detection circuit.

3. The battery pack of claim 1, wherein the detection circuit is located external to the battery pack.

4. The battery pack of claim 3, wherein the detection circuit is located within a power tool.

5. The battery pack of claim 1, further comprising a display for providing an indication of a voltage level of the battery pack.

6. A battery pack comprising:
an outer casing;
a first group of cells positioned within the outer casing, the first group of cells including at least two series-connected cells;
a second group of cells positioned within the outer casing, the second group of cells including at least two series-connected cells;
a third group of cells positioned within the outer casing, the third group of cells including at least two series-connected cells,
wherein the first group of cells, the second group of cells, and the third group of cells are connected in series; and
two tap connections to connect the first group of cells, the second group of cells, and the third group of cells to a detection circuit to provide respective voltages across the first, second, and third groups of cells to the detection circuit,
wherein the detection circuit includes a microprocessor programmed to calculate at least one voltage ratio between the first group of cells and the second group of cells, at least one voltage ratio between the second group of cells and the third group of cells, and at least one voltage ratio between the third group of cells and the first group of cells,
wherein the microprocessor is programmed to compare the at least one voltage ratio between the first group of cells and the second group of cells to a predetermined voltage ratio, compare the at least one voltage ratio between the second group of cells and the third group of cells to the predetermined voltage ratio, and compare the at least one voltage ratio between the third group of cells and the first group of cells to the predetermined voltage ratio, and wherein the microprocessor is programmed to determine at least one of an over-voltage condition and an under-voltage condition of a cell in the first, second or third group of cells based on the comparisons.

7. The battery pack of claim 6, further comprising an interface for connecting the two tap connections to the detection circuit.

8. The battery pack of claim 6, wherein the detection circuit is located external to the battery pack.

9. The battery pack of claim 8, wherein the detection circuit is located within a power tool.

10. The battery pack of claim 6, further comprising a display for providing an indication of a voltage level of the battery pack.

11. A method for determining over-voltage and under-voltage conditions of a battery pack, the method comprising:
grouping at least two of a plurality of series-connected cells in a first group of cells;
grouping at least two of the plurality of series-connected cells in a second group of cells;
grouping at least two of the plurality of series-connected cells in a third group of cells;
connecting the first group of cells, the second group of cells, and the third group of cells to a detection circuit via two tap connections to provide respective voltages across the first, second, and third groups of cells to the detection circuit, the detection circuit including a microprocessor;
calculating, by the microprocessor, at least one voltage ratio between the first group of cells and the second group of cells, at least one voltage ratio between the second group of cells and the third group of cells, and at least one voltage ratio between the third group of cells and the first group of cells,
comparing, by the microprocessor, the at least one voltage ratio between the first group of cells and the second group of cells to a predetermined voltage ratio;
comparing, by the microprocessor, the at least one voltage ratio between the second group of cells and the third group of cells to the predetermined voltage ratio;
comparing, by the microprocessor, the at least one voltage ratio between the third group of cells and the first group of cells to the predetermined voltage ratio; and
determining, by the microprocessor, at least one of an over-voltage condition and an under-voltage condition of a cell in the first, second or third group of cells based on the comparisons.

12. The method of claim 11, wherein the detection circuit is located external to the battery pack.

13. The method of claim 12, wherein the detection circuit is located within a power tool.

14. The method of claim 11, further comprising providing an indication of a voltage level of the battery pack.

* * * * *